United States Patent [19]

Fujisawa et al.

[11] Patent Number: 4,469,953

[45] Date of Patent: Sep. 4, 1984

[54] COMBINATION IONIZATION AND PHOTOELECTRIC SMOKE DETECTOR

[75] Inventors: Takao Fujisawa, Saitama; Masayoshi Saito, Kanagawa; Kohei Yamada; Seiji Tsubouchi, both of Tokyo, all of Japan

[73] Assignee: Nittan Company, Limited, Tokyo, Japan

[21] Appl. No.: 344,989

[22] Filed: Feb. 2, 1982

[51] Int. Cl.$^3$ .............................................. G01N 21/26

[52] U.S. Cl. ...................................... 250/574; 356/338

[58] Field of Search ............... 250/574, 382, 384, 385, 250/381; 356/338; 340/629, 630

[56] References Cited

U.S. PATENT DOCUMENTS 3,731,093 5/1973 Scheidweiler et al. ............. 250/384

4,004,194 1/1977 Doerflinger et al. ............. 174/35 R 4,216,377 8/1980 Hasegawa et al. .................. 356/338

4,225,860 9/1980 Conforti ............................. 340/630

*Primary Examiner*—David C. Nelms

*Assistant Examiner*—J. Brophy

*Attorney, Agent, or Firm*—Abelman, Frayne, Rezac & Schwab

[57] ABSTRACT

A combination type smoke detector comprising a light scattering smoke detector and an ionization smoke detector in which a labyrinth structure dark chamber for the light scattering smoke detector is made of an electroconductive plastic material and functions as the outer electrode of the ionization smoke detector is disclosed. Members of the ionization smoke detector and the light emitter and the light sensing element for the light scattering smoke detector are arranged so that the light emitted from the light source and reflected by said members and the lamina members does not enter the light-sensing element.

5 Claims, 4 Drawing Figures

COMBINATION IONIZATION AND PHOTOELECTRIC SMOKE DETECTOR

FIELD OF THE INVENTION

This invention relates to a smoke detector typically used for fire alarm purposes, particularly to a combination smoke detector in which a light-scattering type smoke detector and an ionization type smoke detector are used in combination.

BACKGROUND OF THE INVENTION

Light-scattering type smoke detectors and ionization type smoke detectors are known. The respective detectors are of different sensitivity to smoke, which makes it desirable to use these two detectors in combination in order to detect smokes of different constituents.

In known combination type smoke detectors, a light-scattering smoke detector having a smoke detection chamber, and, an ionization smoke detector having a separate smoke detection chamber, are provided in a single housing. This combination type of smoke detector inevitably is of large size.

In a light-scattering type smoke detector, it is essential to prevent unwanted light from reaching the light-sensing element as this produces noise in the wanted signals. Therefore, careful consideration is paid in order to insure that the inside wall and members and parts in the dark chamber do not reflect light.

In the light-scattering type smoke detector, the inside surface of the dark chamber preferably is finished at fineness of 800 mesh or more so as to prevent diffused reflection rather than giving it a light-absorbing finish, such as matted finish or lusterless black coating. The most desirable light-scattering smoke sensor known so far is provided with fine inside finish and a conical projection on the bottom plate in order to deflect the reflected light away from the direction of the light-sensing element. In cases where the dark chamber is sufficiently tall, the reflecting cone is unnecessary.

A most efficacious light-scattering smoke detector is one provided with a dark chamber of so-called labyrinth structure as disclosed in U.S. Pat. No. 4,216,377, Hasegawa. The labyrinth dark chamber comprises a circular bottom plate and a lateral wall which is formed by a plurality of angled lamina members which allow passage of smoke into the chamber while preventing the admission of light. Each lamina member has a cross section comprising a first straight or slightly arcuate portion along the circumference of the bottom plate of the dark chamber, a second straight portion extending from one end of the first portion at an obtuse angle, and a third portion extending from the free end of the second portion and towards an adjacent first portion. The lateral wall of the dark chamber is formed by arranging a plurality of such laminae in overlapping relation with serpentine paths left therebetween. Such a complicated structure cannot be economically manufactured of a metallic material, and labyrinth dark chambers are usually made by molding a plastics material.

DISCLOSURE OF THE INVENTION

According to the present invention a combination smoke detector includes a light-scattering type smoke detector and an ionization type smoke detector which are both contained within a dark chamber of the so-called labyrinth structure of the light-scattering type smoke detector, that structure comprising a plurality of electrically conductive angled lamina members which provide the outer electrode of the ionization type smoke detector.

The incorporation of the above-mentioned two types of smoke detectors into a smoke detection chamber common to both devices wherein said chamber is used as an outer electrode of the ionization type smoke detector, is hindered with difficulties.

The installation of an ionization type smoke sensing unit into a light-scattering type smoke detector adds to the members and parts which may reflect light. Typical members of the ionization type smoke detector which may reflect light are an intermediate electrode, a sensitivity-adjusting screw and supporting members.

Labyrinth dark chambers made of an electroconductive plastic well function as the outer electrode for the ionization type smoke detector.

The preferred electroconductive plastic materials are polymers which contains electroconductive carbon black powder, especially acetylene black. The usable polymer includes polyvinyl chloride, polystyrene, ABS resins etc. There is no limitation in carbon black content, but a preferred range is 10–30%, and the preferred plastic materials are polyvinyl chloride and polycarbonate resin containing about 15% acetylene black. The labyrinth dark chamber is made integrally by molding one of these electroconductive plastic materials.

In the design of combination type smoke detectors, we have found that when the relative position of the light source and the light-sensing unit is reversed, the signal to noise ratio is remarkably improved. Thus we have concluded that noise is remarkably reduced if the light source, the light-sensing unit and members and parts in the dark chamber are arranged so that the light-emitting head and members which may reflect the light from the light source are located on the same side with respect to any normal line to any surface of the lamina members which may receive the light from the light source.

According to this invention, there is provided a combination smoke detector provided with a light-scattering type smoke detector in which the light source and the light-sensing unit are located in a common vertical plane, and an ionizaion type smoke detector, a dark chamber of labyrinth structure consisting of a generally cylindrical lateral wall comprised of a plurality of angled lamina members, a bottom plate and a base plate, said dark chamber being made of an electroconductive plastic material and functioning as the outer electrode.

According to a further aspect of this invention, there is provided a combination smoke detector as described above, wherein the light source and the light-sensing unit of the light-scattering type smoke detector and the members of the ionization type smoke detector are arranged so that members which may reflect the light from the light source and the light-emitting head of the light source are located on the same side with respect to any normal line to any surface of the lamina members which may receive the light from the light source.

A preferred embodiment of the invention is described with reference to the attached drawings.

DETAILED DESCRIPTION OF THE INVENTION

Figure 1:
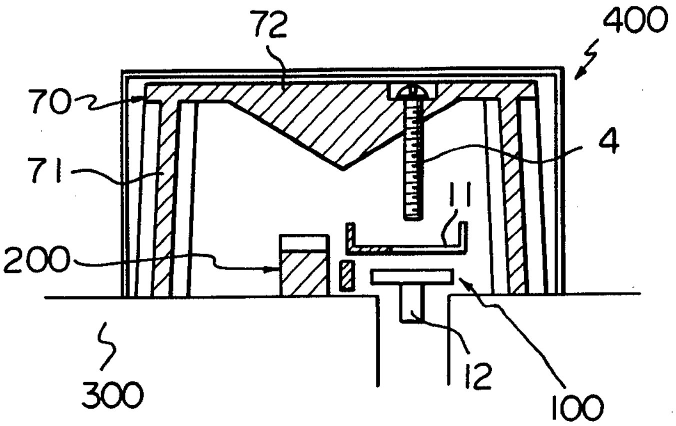
FIG. 1 is a schematic elevational cross-sectional view showing an embodiment of the combination smoke detector in accordance with this invention, taken along the Line B—B in FIG. 2.

A combination type smoke detector according to this invention includes a housing 70 made by molding polycarbonate resin ("Teijin Panlight L-1225") containing about 15% by weight of acetylene black, and which functions as the outer electrode of an ionization type smoke detector 100, and as a labyrinth dark chamber of a light-scattering type smoke detector 200. The housing 70 is completed by a closure plate 72 and a base plate 300, and optionally is positioned within a decorative housing 400.

The function of the light-scattering type smoke detector is well described in the above-mentioned U.S. Pat. No. 4,216,377, and is therefore not explained in detail. Also the function of the ionization type smoke detector is well known in the art, and not specifically explained in detail. It is pointed out that the ionization type smoke detector includes a sensitivity adjustment screw 4 is secured on the closure plate 72 of the labyrinth dark chamber 70, and thereunder an intermediate electrode 11 and an inner electrode 12 are provided.

As disclosed in the above-mentioned U.S. patent specification, the labyrinth dark chamber is composed of a plurality of angled lamina members 71 which are arranged on the periphery of the circular closure plate 72, so that they form a cylindrical wall with a serpentine path provided between each two neighboring members through which smoke can flow into the chamber. The angled lamina members form a barrier which prevents the penetration of light into the chamber as is well explained in the above-mentioned patent. The decorative housing 400 is constructed to allow passage of smoke.

In the case of the known light-scattering type smoke detector, it suffices if the angled lamina members and the light source are designed and arranged so that light emitted from the light source is reflected by the surface of the angled lamina members so as not to enter the light-sensing element 6. In the case of this invention, the parts and members, especially the sensitivity-adjusting screw 4, of the installed ionization type smoke detector, reflect light and the reflected light will enter the light-sensing element 6, if the arrangement is improper.

Figure 2:
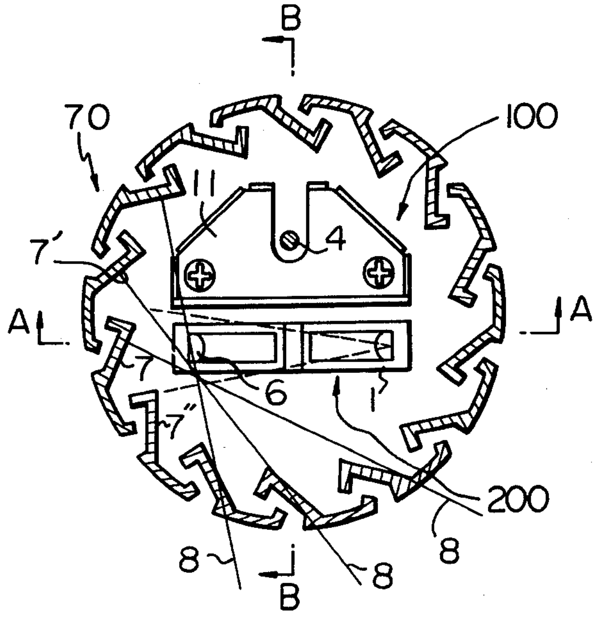
FIGS. 2 and 3 are schematic plan views showing the relative location of a light-scattering type smoke detector and an ionization type smoke detector in a single labyrinth dark chamber in accordance with this invention.
Figure 3:
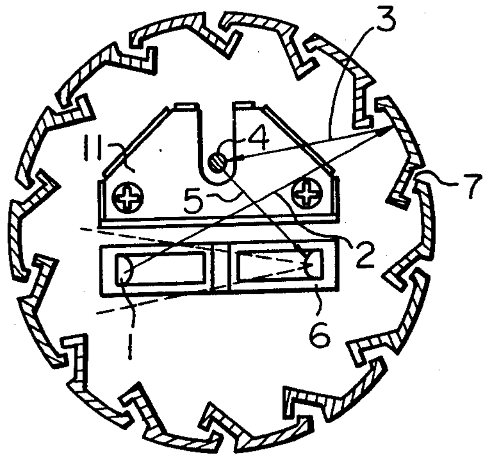
Figure 4:
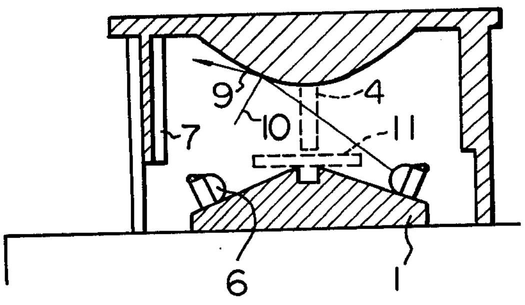
FIG. 4 is an elevational cross-sectional view along Line A—A in FIG. 2.

When the angled lamina members, the light-scattering type smoke detector and the ionization type smoke detector are arranged as shown in FIG. 2, if the light source 1 is placed on the left side instead of the right side as shown in this figure, then a rays emitted from the light source 1 may hit the surface of a lamina member and be reflected by the surface of the lamina member and then hit the sensitivity adjustment screw 4 and then be reflected so as to enter the light-sensing element 6.

In contrast, according to this invention, as seen in FIG. 2, the light source 1 is located on the right side. In this arrangement, any ray emitted from the light source is reflected by the surface of a lamina member 7 in a direction away from the adjusting screw 4 of the ionization smoke detector 100. Therefore, no rays hit the sensitivity adjustment screw. This relation can be expressed generally as follows. The light reflecting members such as sensitivity adjustment screw, intermediate electrode and the light-emitting head of the light source are each placed on the same side with respect to any line 8 normal to the inside surfaces of the angled lamina members.

The rays from the light source are projected to the bottom surface of the dark chamber. In this embodiment, the light-scattering smoke detector is designed so that the rays from the light source 1 may hit the conical projection of the bottom plate with large incidental angles and thus may be reflected to the directions away from the light-sensing unit.

As has been described above, this invention provides a combination type smoke detector which brings about a good sensitivity to smoke with a very high signal to noise ratio, even if the inside surface of the dark detection chamber is not finished with a light absorbing coating.

We claim:

1. In a smoke detector of the type including a dark chamber of labyrinth structure consisting of a generally cylindrical lateral wall comprised of a plurality of angled lamina members, a closure plate, a base plate, and a photoelectric smoke detector located within said dark chamber, the improvement comprising:

the incorporation into said smoke detector of an ionization smoke detector, said dark chamber being formed from an electrically conductive plastics material and providing an outer electrode of said ionization smoke detector; and, the further improvement comprising said photoelectric detector and elements of said ionization chamber that are positioned within said dark chamber being positioned in spaced relationship;

a light emitting source of said photoelectric detector positioned in non-illuminating relationship with said elements of the ionization detector and illuminating an interior wall portion of said dark chamber;

the lamina comprising said wall portion each being angled relative to incident light rays from said light source to reflect said incident light rays away from said internally positioned elements of said ionization detector.

2. The combination type smoke detector as claimed in claim 1, of which the dark chamber is integrally made by molding an electroconductive plastic material.

3. The combination type smoke detector as claimed in claim 1, wherein the electroconductive plastic material is a carbon black containing polymer, said polymer being selected from a group consisting of polyvinyl chloride, polystyrene, acrylic resin, ABS resin, polyamide resin, polyacetal resin, polycarbonate resin, and polyolefin resins.

4. The combination type smoke detector as claimed in claim 3, wherein the polymer contains 10–30% by weight of acetylene black.

5. The combination type smoke detector as claimed in claim 4, wherein the electroconductive plastic material is polycarbonate resin containing 12–18% by weight of acetylene black.

* * * * *